Jan. 12, 1971   R. S. WITTE ET AL   3,555,451
LASER COLD CATHODE APPARATUS
Filed March 28, 1968
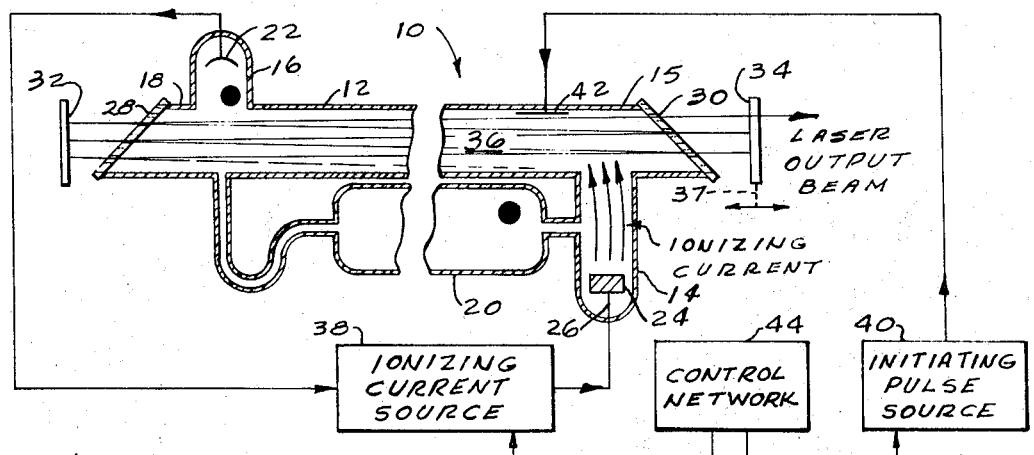
FIG. 1
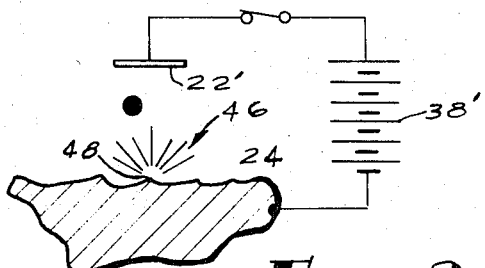
FIG. 2
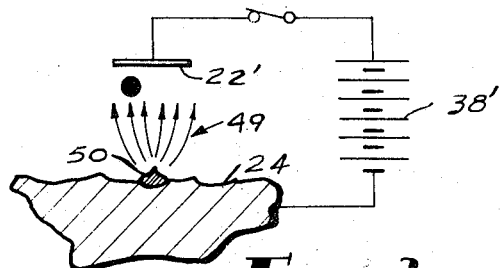
FIG. 3
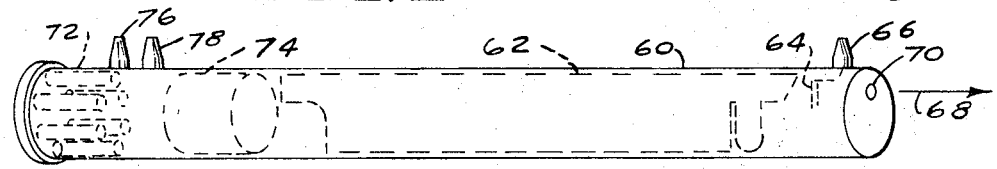
FIG. 7
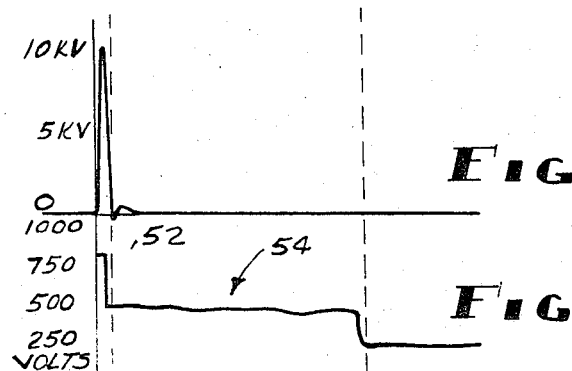
FIG. 4
FIG. 5
FIG. 6
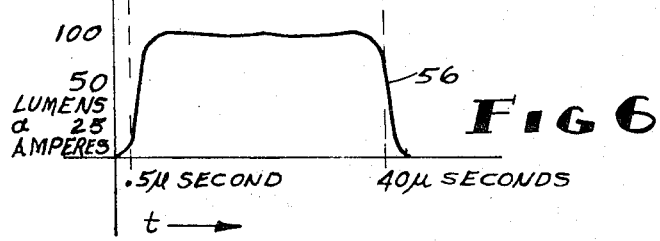
ROBERT S. WITTE
CHARLES E. WOOD
INVENTORS
BY Daniel T. Anderson
ATTORNEY 2,555,451
Patented Jan. 12, 1971

---

3,555,451
LASER COLD CATHODE APPARATUS
Robert S. Witte, Redondo Beach, and Charles E. Wood, Woodland Hills, Calif., assignors to TRW Inc., Redondo Beach, Calif., a corporation of Ohio
Filed Mar. 28, 1968, Ser. No. 716,939
Int. Cl. H01s *3/02*
U.S. Cl. 331—94.5                5 Claims

ABSTRACT OF THE DISCLOSURE

This specification discloses a laser system made truly portable by the combination therein of a cold cathode providing high, direct current, electron flow for gas-ion laser pumping requirements. The cathode in the example shown may be a pellet of indium which is exposed to an electric field when emission is required.

BACKGROUND OF THE INVENTION

(1) Field of the invention

The invention relates generally to electron emission devices and methods and, more particularly, to non-electrically heated, or so-called cold, cathodes for providing predetermined electron fluxes.

Although the invention finds particularly useful application in the field of electron pumped gas-ion laser systems; and although, in the cause of brevity and clarity, much of the following discussion and descritpion of examples of the invention relate thereto, it is expressly to be understood that the advantages of the invention are equally well manifest in other electron stream devices, such as, for example, particle accelerators, traveling wave tubes, X-ray apparatus, and the like.

(2) Description of the prior art

With the advent of lasers has come the development in recent years of a broad array of laser systems for utilizing now well-known laser capabilities in many diverse applications and fields. Expanding laser technology into some areas of endeavor, for example, industrial and military, has required at least some degree of portability of the laser system; and their true practicality in some important applications has been precluded by the prior art limitations on system portability due, for example, to power supply requirements and problems associated therewith. In order, for example, to take advantage of the merits of an electron stream pumped argon-ion laser in a typical embodiment, an electron stream of perhaps hundreds of amperes is required. In accordance with the best known prior art techniques and practices, this electron current is produced by a thermionic cathode. Obviously, such a cathode must be supplied with great amounts of thermal energy and must suffer the usual low efficiency of low emitted electron energy output per thermal (electric) energy input. Not only does such inefficiency, typically of the order of one percent, represent a high relative waste of energy, but it also represents a large amount of energy on an absolute basis which, in a portable system, must be supplied at high cost from batteries or other energy converters and then be intentionally discarded or dissipated by radiation or conduction away from the cathode. Furthermore, the means for providing the necessary dissipation of the wasted energy may cause additional problems of weight and size in designing and achieving a portable system. It may further be noted that the small duty cycle advantages of a pulsed laser may not extend to conservation of cathode heating energy because of the thermal inertia inherent in a practical thermionic cathode. In addition to size and weight considerations, the power supply requirements for such thermionic cathodes create an additional set of cost, reliability, maintenance, and replacement problems.

In addition, however, to the above more or less mechanical disadvantages of providing thermionic power to such cathodes, it may be noted that the hot cathodes are relatively complex, critical, and expensive in their physical composition and construction, as well as in their activation processing and, if exposed to atmospheric or other contamination, must be reactivated by elaborate, time consuming, and costly reprocessing. At best such high emission thermionic cathodes have relatively short lifetimes of non-constant emission characteristics due to such inherent causes as ion bombardment deterioration, chemical contamination, and the like.

Other prior art attempts to solve these problems without incurring the complexities and general disadvantages of optical or radio frequency pumping of the laser have typically been directed toward achieving high density electron emission as from mercury pool cathodes and cold tungsten, stainless steel, aluminum, or tantalum cathodes. However, mercury pool emitters are not only too orientation sensitive for portability, but, more importantly, their high vapor pressure causes very rapid poisoning of the active laser gas. The non-liquid metals mentioned require extremely high field strengths, and, therefore, complex voltage sources, to achieve practical emission fluxes and are exceedingly short lived due in part at least to high deterioration rates from ion bombardment.

It is, accordingly, an object of the present invention to provide a cold cathode as for laser use which is not subject to the inherent disadvantages and limitations of the prior art.

It is another object to provide a truly portable and practicable, in all respects, laser system.

It is another object to provide such apparatus having highly improved overall efficiency.

It is another object to provide such apparatus the overall efficiency of which is, to a first approximation, substantially independent of the duty cycle of the system.

It is another object to provide such apparatus which neither requires nor dissipates significant cathode heating energy and requires no heater energy supply.

It is another object to provide such apparatus which exhibits very long system lifetime.

It is another object to provide such apparatus which does not suffer cathode caused contamination of the laser gas or condensate fogging of the laser windows or other elements.

It is another object to provide such apparatus which is very simple, non-critical, and inexpensive to manufacture, maintain, and operate.

It is another object to provide such apparatus which is not orientation sensitive.

It is another object to provide such apparatus which does not require activation or reactivation processing of its cathode.

SUMMARY OF THE INVENTION

Briefly, these and other objects are achieved in accordance with the structural aspects of an example of the invention in which a cathode is formed as a solid segment from a low melting point metal of a character exhibiting a low, non-contamination, vapor pressure in its molten state. When a potential of the order of a few hundred volts is applied to the cathode-anode pair, a discharge is initiated at some slight surface irregularity of the cathode and may be continued indefinitely at current magnitudes of hundreds of amperes. The emission, in a pulsed mode, causes a microscopically local heating and melting effect associated with a lateral movement or displacement from each other of the successive small emitting spots over the surface of the cathode segment. The solid segment becomes only slightly warm during even extended periods of operation and substantially no gaseous contamination or emitting surface deterioration occurs after the thousands of hours of high power level operation.

Further details of these and other novel features of the invention including, for example, its structural and method cooperation with laser and other system embodiments, as well as additional objects and advantages of the invention and their principles of operation will become apparent and be best understood from a consideration of the following description, when taken in connection with the accompanying drawing, which is presented by way of an illustrative example only.

BRIEF DESCRIPTION OF THE DRAWING

FIG. 1 is a schematic, partially block diagram illustrating an example of a laser system embodying a cold cathode constructed in accordance with the principles of the present invention;

FIG. 2 is a diagrammatic view of a portion of the cathode-anode circuit illustrating an enlarged portion of the cathode surface just prior to electron emission start;

FIG. 3 is a similar view showing the cathode surface during electron emission;

FIGS. 4, 5, and 6 are separate plots, along a common time abscissa, of various electrical parameters of the apparatus of the previous figures during a cycle of its operation; and FIG. 7 is an overall view of a portable laser system constructed in accordance with various structural aspects of the present invention.

DESCRIPTION OF A PREFERRED EMBODIMENT

With specific reference now to the figures in detail, it is stressed that the particulars shown are by way of example and for purposes of illustrative discussion only and are presented in the cause of providing what is believed to be the most useful and readily understood description of the principles and structural concepts of the invention. In this regard, no attempt is made to show structural details of the apparatus or functional aspects of its operation in more detail than is necessary for a fundamental understanding of the invention. The description taken with the drawing will make it apparent to those skilled in the laser and electron device arts how the several forms of the invention may be embodied in practice. Specifically, the detailed showing is not to be taken as a limitation upon the scope of the invention, which is defined by the appended claims forming, along with the drawing, an integral part of this specification.

In FIG. 1, the example of the portable laser system shown includes a sealed envelope 10 having an elongate, interaction body portion 12 with, in this example, a cathode appendage portion 14 depending in gaseous and electron current flow communication relation with an end portion 15, and a collector appendage portion 16 which may be similarly related to the oppositely disposed end portion 18 of the interaction body portion 12. A laser gas reservoir portion 20 interconnects, in a bypass or molecule recirculation relationship, the end portions 15, 18 of the body portion 12. A collector anode electrode 22 is supported within the appendage portion 16; and the non-thermionic, cathode electrode 24 is disposed within the envelope appendage 14. The collector electrode 22 may be a single wire electrode, indium having been found to be of relative merit with respect to anode spattering and other physical and chemical considerations.

The cathode electrode 24, although shown schematically as though supported on a lead-through wire 26, is preferably conformed to the inner surface of the appendage portion 14 whereby the cathode is not cantilevered about its lead-through glass-to-metal seal. This aspect gives rise to greater ruggedness and less acceleration sensitivity of the overall system as a portable unit. The composition of the cathode pellet may be bismuth, lead, tin, indium, gallium, or others, or alloys having the properties of low melting point, low vapor pressure, low work function, and low chemical activity.

The axially spaced end portions 15, 18 define therebetween a laser interaction path which is terminated at each end, in this example, by a planar window element 28, 30 secured in a sealed relation to the envelope body at its Brewster angle with respect to the direction of the axial interaction path.

Disposed outside of, in this example, the envelope 10 in optical alignment with the interaction path is a pair of parallel mirror elements 32, 34 defining therebetween the length of the optical cavity of which the regenerative laser interaction region 36 within the body portion 12 is a part. The output mirror element 34 may be a partial mirror whereby a predetermined portion of the light energy incident upon its reflective surface is reflected or fed back in resonance through the interaction region of the cavity and the remainder is transmitted, as shown, to constitute the laser output beam. The mirror element 34 may be axially adjustable as indicated at 37 for tuning the cavity length as by, for example, micrometer adjustment means.

A source 38 of ionizing current is shown interconnected between the cathode 24 and the collector anode 22. Similarly, an initiating and conditioning pulse source 40 is connected between the cathode 24 and an auxiliary anode 42. A control network 44 is shown coupled to the circuit components 38, 40 for controlling the electrical parameters of the laser, such as, for example, duty cycle, peak current, pulse shape, and the like. System operation is discussed below in connection with FIGS. 4, 5, and 6.

Referring to FIGS. 2 and 3, the fundamental operation of the cold, that is, non-thermionic, cathode is indicated by microscopic views of a portion of the cathode electrode 24 in association with the anode electrode 22' and an interconnected battery source of ionizing current 38'.

At the instant of interconnection and energization of the circuit, an intense electric field, indicated at 46, is created and concentrated about some random irregularity in the cathode surface, such as the point 48. The field concentration may result, typically, in field strengths of the orders of $10^6$ to $10^8$ volts per centimeter in the region of a point having a radius of the order of $10^{-4}$ centimeters.

FIG. 3 illustrates the resulting electron emission in a stream 49 with Joule heating in the cathode body causing a microscopic molten spot 50. In practice, when high currents, for example in pulses of the order of 100 amperes are drawn, successive emissive spots are seen to move laterally rapidly over the cathode surface, presumably from forces and effects due to magnetic fields associated with the emitted current, increased resistance due to the Joule heating, and others.

With reference to FIGS. 4, 5, and 6, a typical mode of operation of the portable, cold cathode, laser system illustrated in FIG. 1 may be described: an argon gas charged system is assumed, and a duty cycle utilizing a .3 microsecond pulse with a 60 hertz repetition rate is desired. By adjustment of the ionizing current source 38 via conventional means in the control network 44 the length of the laser pulse may be shortened or lengthened over an exceedingly broad range; and the light output may be varied over a wide range of intensity, all to satisfy the requirements of particular applications while maximizing the lifetime of the portable, battery power source.

At the beginning of the cycle, a potential of approximately 800 volts is impressed upon the anode electrode 22, as indicated by the initial portion 52 of the voltage curve 54 of FIG. 5. Immediately after the beginning of the cycle, a .5 microsecond pulse of the order of 10 kilovolts is impressed upon the auxiliary conditioning anode 42. The resulting electric fields between the anode 42, the collector anode 22, and the emissive cathode 24 cause, independently, (1) a preionizing conditioning in the gaseous lasing medium in the region 36 and lowers its effective impedance as seen by the cathode, and (2) a start emission condition at the cathode emissive surface.

The subsequent cathode emission is indicated by the curve 56 of the FIG. 6. The electron current, of approximately 100 amperes magnitude in this example, traverses the laser interaction region 36 causing the cascading, kinetic bombardment ionization of the argon atoms which results in their desired population inversion, or laser pumping. The laser light output is substantially proportional to the magnitude of the ionizing current as indicated by the ordinate legend for the curve 56.

The desirably substantially constant light output indicated by the curve 56 is achieved, in this example, by providing a program for the voltage more or less along the lines of the curve 54 of FIG. 5: a level of approximately 800 volts for a period of approximately .1–.2 microsecond where it may be decreased to an amplitude of approximately 450 volts for the remainder of the duty portion of the cycle where it may be lowered to approximately 200 volts at which level lasing action cut-off appears as indicated along the 40 microsecond dashed line drawn parallel to the ordinate on the graphs of FIGS. 4, 5, and 6.

Referring to FIG. 7, an overall view of a practical example of a cold cathode, argon-ion, portable embodiment of the invention is presented in which a metallic, tubular housing body 60 having dimensions of approximately 2 inches outside diameter and 20 inches overall length contains the entire system. The sealed gaseous laser component 62 is carried by the housing body and is supported therewithin by a cushion of formed-in-place plastic foam (not shown). A cavity end mirror element 64 is optically coupled to the active lasing media, as described in connection with the earlier figures, and is externally adjustable for resonance tuning by an axial movement providing means indicated by the knob member 66 coupled to the mirror element 64. The laser output beam, indicated at 68, emerges from the system through the end aperture 70 which may when desired be a hermetic transparent window. In this connection it may be noted that the flashlight-sized package operating in the green range at 5145 angstroms is particularly suited for underwater utilizations.

At the left hand end, as seen in the figure, the tubular housing body is fitted with an end cap to provide access to a plurality of penlight type dry cell batteries 72 which constitute the power source for the ionizing current pulses. Disposed in a cushioned, foam supported relation between the laser component 62 and the battery pack 72, a power conditioning and control network 74 is indicated having adjustment control knobs 76, 78 coupled thereto as for determining pulse length, repetition rate, and/or light intensity.

Portable laser systems constructed and packaged along the lines indicated in FIG. 7 and as discussed in connection with the earlier figures are readily capable of achieving a peak power level of several watts with pulse lengths variable from 3/10 microsecond and having repetition rates of from single pulse to 1000 hertz. The light beam diameter may readily be as small as a few millimeters with an angular spread of a few microradians.

Effective system lifetimes vary with gas reservoir capacity, pulse intensity, pulse repetition rate, and other operating parameters; however, systems as described above utilizing argon gas and an indium cathode have operated in practical embodiments more than 400 hours for more than $10^7$ high intensity pulses without system degrading and without contamination of the gas or fogging of the window elements. This is considered to be due at least in part to the fact that the surface temperature of the indium remains at all times well below the thermionic emitting range and the resulting vapor pressure of the emitting indium, as well as its chemical activeness, is negligible. In this connection it may be noted that neon-ion laser examples of the invention have been operated with peak ionizing currents of magnitude greater than 1000 amperes with no indication of emission current saturation. Particularly to be noted is that such a complete system may weigh of the order of 5 pounds and require only a few watts of input power as opposed to the approximately 80 watts heretofore required for thermionic cathode power needs alone.

There have thus been disclosed and described various structural and operational aspects of examples of a new cold cathodes, portable, gas-ion laser system which achieves the objects and exhibits the advantages set forth hereinabove.

The embodiments of the invention in which an exclusive property of privilege is claimed are defined as follows:

1. In a gaseous ion laser system where the gas is capable of being ionized by electron impact to provide a large current flow:
   (a) an anode element in communication with the gas;
   (b) a non-heated cathode element in communication with the gas and comprising a member selected from the group consisting of indium, gallium, bismuth, tin and lead;
   (c) means for applying a voltage between said elements to cause copious electron emission from said cathode element sufficient to maintain the gas discharge representing a large current flow; and
   (d) an auxiliary electrode for preionizing said gas to enable said electron emission to start.

2. A laser system as defined in claim 1 wherein an elongated envelope is provided for containing at least a portion of the gas, a bypass reservoir interconnected between the end portions of said envelope and in gas circulating relationship so as to equalize the gas pressure in said envelope.

3. A laser system as defined in claim 1 which further includes a discharge-initiating pulse source electromagnetically coupled to said cathode element through at least a portion of the gas.

4. A laser system as defined in claim 1 which further includes:
   (a) an elongated envelope for containing at least a portion of the gas;
   (b) an elongated tubular housing within which said envelope is disposed; and
   (c) protective support means interposed between said envelope and said housing for absorbing energy.

5. A gaseous ion laser system comprising:
   (a) a gas, laserable in its ionized state and adapted to be pumped by kinetic interaction with electrons;
   (b) an elongated insulating envelope for said gas;
   (c) at least one appendage portion of insulating material in communication with said envelope;
   (d) a non-heated cathode consisting of indium in intimate contact with the inner surface of said appendage portion;
   (e) an anode disposed in contact with said gas, whereby the application of a voltage between said cathode and anode will cause emission of electrons sufficient to maintain a gas discharge causing a large current flow; and (f) an auxiliary electrode for preionizing said gas to enable said emission of electrons to start.

References Cited

UNITED STATES PATENTS

| | | | |
|---|---|---|---|
| 2,793,314 | 5/1957 | White | 313—218 |
| 3,277,396 | 10/1966 | Statz et al. | 331—94.5X |
| 3,394,320 | 7/1968 | Medicus | 331—94.5 |
| 3,396,301 | 8/1968 | Kobayashi et al. | 331—94.5X |
| 3,402,367 | 9/1968 | Kobayashi | 331—94.5 |
| 3,427,564 | 3/1969 | Okaya et al. | 331—94.5 |
| 3,447,098 | 5/1969 | Eckberg | 331—94.5 |
| 3,453,490 | 7/1969 | Hallock et al. | 331—94.5X |
| 3,465,358 | 9/1969 | Bridges | 331—94.5 |

FOREIGN PATENTS 977,545  12/1964  Great Britain  313—311

OTHER REFERENCES

Hochuli et al.: Review of Scientific Instruments, vol. 36, pp. 1493–94, October 1965.

Smith: Journal of Applied Physics, vol. 35, pp. 723–24, March 1964.

RONALD L. WIBERT, Primary Examiner

E. S. BAUER, Assistant Examiner

U.S. Cl. X.R.

313—311